US012644709B2

(12) United States Patent
Zografakis

(10) Patent No.: US 12,644,709 B2
(45) Date of Patent: Jun. 2, 2026

(54) BLUE VISBY-OPTIMIZED COORDINATION OF WATER-BASED TRANSPORT VESSELS

(71) Applicant: Blue Visby Services Limited, London (GB)

(72) Inventor: Charalampos Zografakis, Kent (GB)

(73) Assignee: Blue Visby Services Limited, London (GB)

( * ) Notice: Subject to any disclaimer, the term of this patent is extended or adjusted under 35 U.S.C. 154(b) by 262 days.

(21) Appl. No.: 18/261,987

(22) PCT Filed: Jan. 6, 2022

(86) PCT No.: PCT/IB2022/050093
§ 371 (c)(1),
(2) Date: Jul. 18, 2023

(87) PCT Pub. No.: WO2022/157589
PCT Pub. Date: Jul. 28, 2022

(65) Prior Publication Data
US 2024/0085187 A1     Mar. 14, 2024

Related U.S. Application Data

(60) Provisional application No. 63/140,424, filed on Jan. 22, 2021.

(51) Int. Cl.
*G06Q 10/08* (2024.01)
*B63B 49/00* (2006.01)
(Continued)

(52) U.S. Cl.
CPC ............ *G01C 21/203* (2013.01); *B63B 49/00* (2013.01); *G06Q 10/083* (2013.01)

(58) Field of Classification Search
CPC . G01C 21/20; G08G 3/00; G08G 3/02; G06Q 10/08; G06Q 10/0835; G06Q 10/1091; B63B 49/00
(Continued)

(56) References Cited

U.S. PATENT DOCUMENTS 11,829,935 B2 * 11/2023 Dulebenets ........ G06Q 10/1091
2018/0201348 A1     7/2018 Delay et al.
(Continued)

FOREIGN PATENT DOCUMENTS

CN     109740494 A     5/2019
CN     111580499 A     8/2020
(Continued)

OTHER PUBLICATIONS

An English-translated version of WO 2020245491 A1 by Tchetchine Konstantin (Year: 2020).*
(Continued)

*Primary Examiner* — Cuong H Nguyen
(74) *Attorney, Agent, or Firm* — Quarles & Brady LLP

(57) ABSTRACT

Novel tools and techniques are provided for implementing optimized coordination of water-based transport vessels. In various embodiments, a computing system may receive at least two of first data (including tracking system data including location of each vessel within a predetermined geographical region), second data (including specific vessel-related information, including position data, speed data, draft data, voyage information, on-board fuel consumption sensor data, and/or maintenance records), and/or third data (including satellite-based observation data including relational data associated with the vessels within the predetermined geographical region relative to other vessels, anchorage points, ports, and/or preset waiting locations). The computing system may analyze the at least two of the first,
(Continued)

second or third data to calculate an optimal course, target arrival time, and/or speed at which a first vessel among a plurality of vessels should travel from its current position to a first preset waiting location outside of the destination port.

20 Claims, 7 Drawing Sheets

(51) Int. Cl.

| | | |
|---|---|---|
| *G01C 21/20* | (2006.01) | |
| *G08G 3/00* | (2006.01) | |
| *G08G 3/02* | (2006.01) | |
| *G06Q 10/083* | (2023.01) | |

(58) Field of Classification Search
USPC .......................................... 705/337, 1.01, 7.11
See application file for complete search history.

(56) References Cited

U.S. PATENT DOCUMENTS

| | | | |
|---|---|---|---|
| 2019/0303859 A1* | 10/2019 | Dulebenets | G06Q 10/1091 |
| 2020/0184828 A1* | 6/2020 | Mazor | G07C 5/008 |
| 2023/0072997 A1* | 3/2023 | Chu | G01C 21/3492 |
| 2025/0182025 A1* | 6/2025 | Chu | G05D 1/644 |

FOREIGN PATENT DOCUMENTS

| | | | | |
|---|---|---|---|---|
| CN | 109615933 B | 10/2020 | | |
| JP | 2016060454 A | 4/2016 | | |
| JP | 2017097493 A | 6/2017 | | |
| WO | 2014115352 A1 | 7/2014 | | |
| WO | WO 2020/115731 A1 | 6/2020 | | |
| WO | WO-2020245491 A1 * | 12/2020 | | C02F 1/008 |
| WO | WO-2022157589 A1 * | 7/2022 | | G05D 1/644 |

OTHER PUBLICATIONS

Chen, Weijie, et al. "Monitoring and evaluation of ship operation congestion status at container ports based on AIS data." Ocean & Coastal Management 245 (2023): 106836.*

Li, Bokang, et al. "Berth allocation and scheduling at marine container terminals: A state-of-the-art review of solution approaches and relevant scheduling attributes." Journal of Computational Design and Engineering 10.4 (2023): 1707-1735.*

Akakura, Yasuhiro. "Analysis of offshore waiting at world container terminals and estimation of CO2 emissions from waiting ships." Asian Transport Studies 9 (2023): 100111.*

Pahl, Julia. "Just-in-Time Port Call Optimization: Challenges and IT-Systems." Journal of Physics: Conference Series. vol. 2867. No. 1. IOP Publishing, (Year: 2024). (Year: 2024).*

An abstract of "On the Efficiency Impacts of Berthing Priority Provision" by Xi Lin, (Year: 2024). (Year: 2024).*

Kim, GeunSub, Eunsu Lee, and BoKyung Kim. "Strategic port management by consolidating container terminals." Asian Journal of Shipping and Logistics (AJSL) 38.1: 19-24 (Year: 2022). (Year: 2022).*

JUrsavas, Evrim. "Priority control of berth allocation problem in container terminals." Annals of Operations Research 317.2; 805-824 (Year: 2022). (Year: 2022).*

Sun, Bin, et al. "Cooperative optimization for port and shipping line with unpredictable disturbance consideration." 2018 14th International Conference on Natural Computation, Fuzzy Systems and Knowledge Discovery (ICNC-FSKD). IEEE, 2018.

International Maritime Organization (imo): "Just in time arrival guide", Dec. 31, 2020 (Dec. 31, 2020), pp. 1-74, Retrieved from the Internet: URL: https://wwwcdn.imo.org/localresources/en/OurWork/PartnershipsProjects/Documents/GIA-just-in-time-hires.pdf.

Summons to attend oral proceedings pursuant to Rule 115(1) EPC, corresponding to EP 22700196.3, dated Sep. 18, 2025.

Office Action, corresponding to JP2023-544224, dated Dec. 2, 2025.

Examination Result and Search Report, corresponding to P60001797/2023, dated Dec. 24, 2025.

International Search Report and Written Opinion, International Application No. PCT/IB2022/050093, International Search Authority—European Patent Office, mailed Mar. 28, 2022.

Heng Zhang et al., "Green Shipping Oriented Coordinated Berth Allocation for Port Group", 2015, 34th Chinese Control Conference, Jul. 28, 2015 pp. 8466-8471.

Ji Kaixiang et al., "Accurate Bounding Box for Ship Detection on Remote Sensing Images With Complex Background", Spie Proceedings Issue 0277-786X, Feb. 14, 2020, 1 page.

Written Opinion, International Application No. PCT/IB2022/050093, International Search Authority—European Patent Office, mailed Mar. 28, 2022.

\* cited by examiner

Figure 4A:
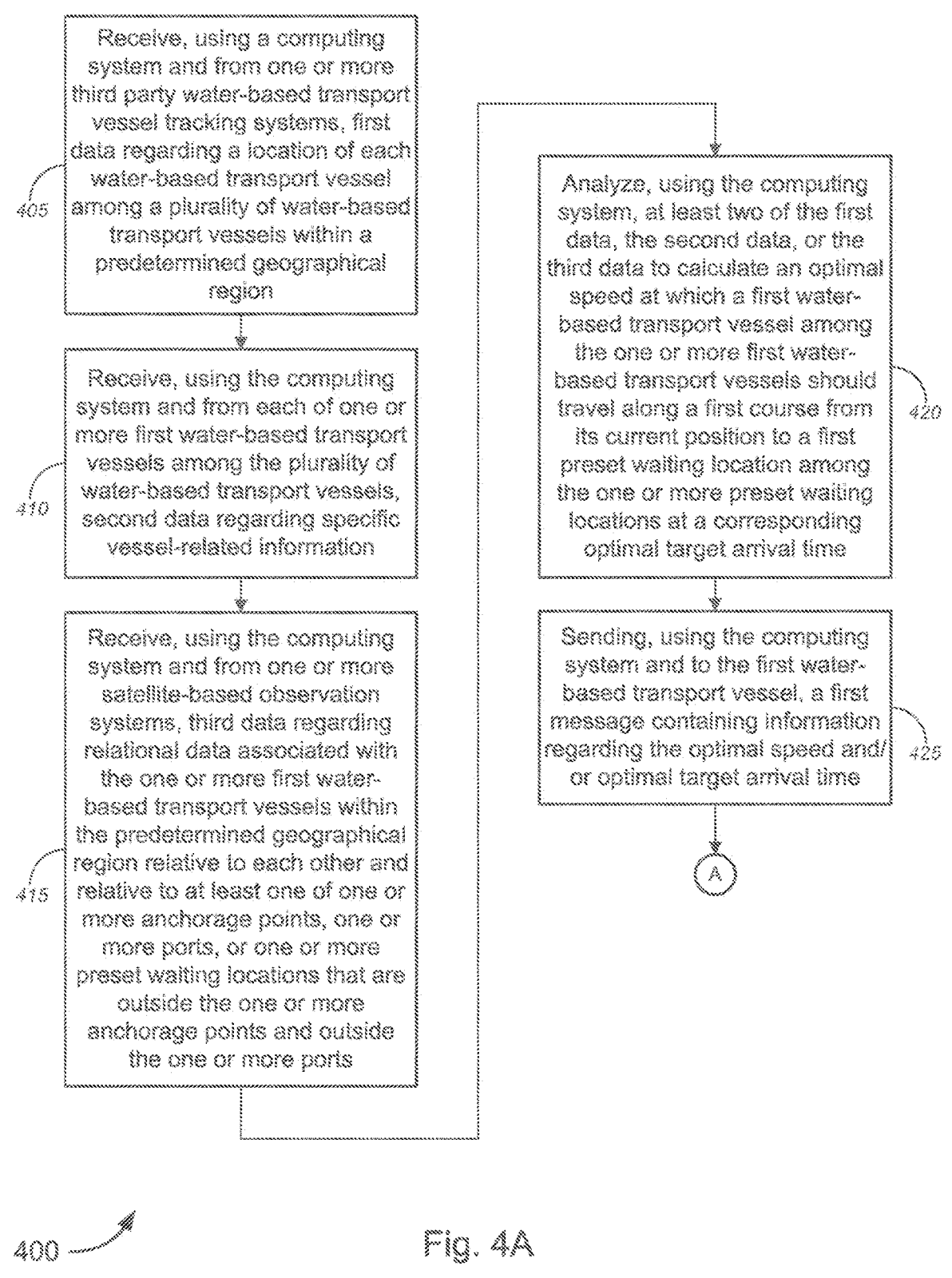

Receive, using a computing system and from one or more third party water-based transport vessel tracking systems, first data regarding a location of each water-based transport vessel among a plurality of water-based transport vessels within a predetermined geographical region

405

Receive, using the computing system and from each of one or more first water-based transport vessels among the plurality of water-based transport vessels, second data regarding specific vessel-related information

410

Receive, using the computing system and from one or more satellite-based observation systems, third data regarding relational data associated with the one or more first water-based transport vessels within the predetermined geographical region relative to each other and relative to at least one of one or more anchorage points, one or more ports, or one or more preset waiting locations that are outside the one or more anchorage points and outside the one or more ports

415

Analyze, using the computing system, at least two of the first data, the second data, or the third data to calculate an optimal speed at which a first water-based transport vessel among the one or more first water-based transport vessels should travel along a first course from its current position to a first preset waiting location among the one or more preset waiting locations at a corresponding optimal target arrival time

420

Sending, using the computing system and to the first water-based transport vessel, a first message containing information regarding the optimal speed and/or optimal target arrival time

Processor(s)

510

Input Device(s)

515

Output Device(s)

520

Storage Device(s)

525

Communications Subsystem

530

Working Memory

Operating System

540

535

545

Application(s)

500

BLUE VISBY-OPTIMIZED COORDINATION OF WATER-BASED TRANSPORT VESSELS

RELATED APPLICATIONS

This application is a 35 U.S.C. § 371 national phase application of PCT/IB2022/050093 (WO-2022/157589 A1), filed on Jan. 6, 2022, entitled "BLUE VISBY-OPTIMIZED COORDINATION OF WATER-BASED TRANSPORT VESSELS", and claims priority to U.S. Provisional Application No. 63/140,424, filed on Jan. 22, 2021, both of which are incorporated herein by reference in their entirety.

COPYRIGHT STATEMENT

FIELD

The present disclosure relates, in general, to methods, systems, and apparatuses for implementing coordination of vehicles, and, more particularly, to methods, systems, and apparatuses for implementing optimized coordination of water-based transport vessels (referred to herein as "Blue Visby").

BACKGROUND

Maritime transport contributes about 2% of worldwide greenhouse gas ("GHG") emissions, a large part of which may be attributed to Bulk Cargo Vessels and Container Vessels, or the like (collectively, "Cargo Vessels" or the like). Conventionally, Cargo Vessels steam from the load port to the discharge port at a service speed, regardless of the movements of other ships or of other Cargo Vessels destined for the same port, and regardless of present or expected congestion due to the conventional "Sail Fast, Then Wait" ("SFTW") operational model typically employed by Cargo Vessels.

Reducing the speed of a fleet of Cargo Vessels, is a technical problem that requires technical, operations, and contractual interventions. At present, there are no technical, operational, or contractual arrangements in place for the coordination of the voyages of ocean-going cargo ships, along the lines of air traffic control or airspace management systems. All prior attempts to solve such problems have foundered due to commercial and contractual obstacles that are exacerbated by the fragmentation of maritime and port industries.

Hence, there is a need for more robust and scalable solutions for implementing coordination of vehicles, and, more particularly, to methods, systems, and apparatuses for implementing optimized coordination of water-based transport vessels.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A and 4B are flow diagrams illustrating a method for implementing optimized coordination of water-based transport vessels, in accordance with various embodiments.

DETAILED DESCRIPTION OF CERTAIN EMBODIMENTS

Overview

Figure 1:
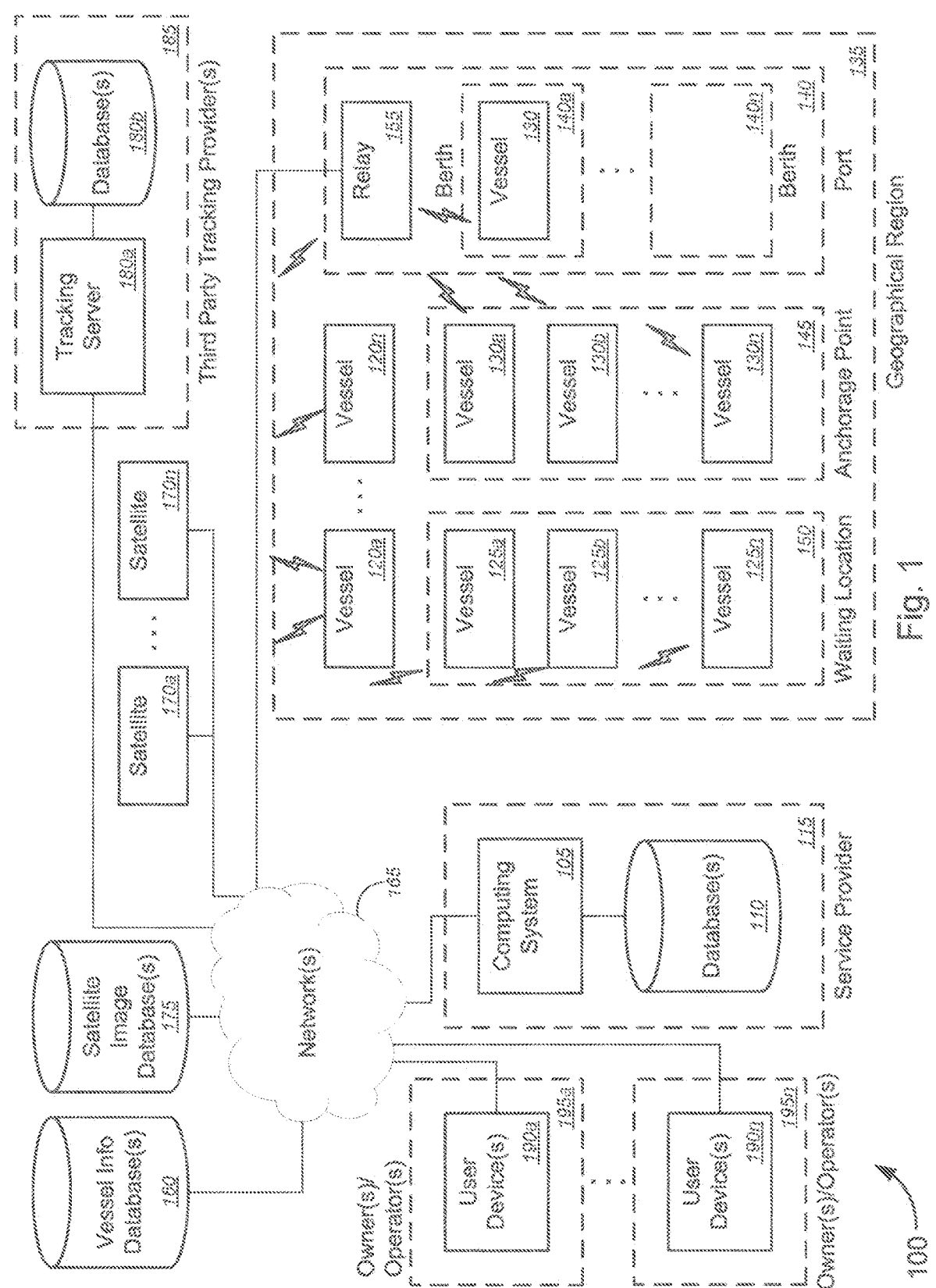
FIG. 1 is a schematic diagram illustrating a system for implementing optimized coordination of water-based transport vessels, in accordance with various embodiments.

Various embodiments provide tools and techniques for implementing coordination of vehicles, and, more particularly, to methods, systems, and apparatuses for implementing optimized coordination of water-based transport vessels.

In various embodiments, a computing system may receive at least two of first data, second data, or third data. In some cases, the first data may be data from one or more third party water-based transport vessel tracking systems and may include a location of each water-based transport vessel among a plurality of water-based transport vessels within a predetermined geographical region. In some instances, the second data may be data associated with each of one or more first water-based transport vessels among the plurality of water-based transport vessels and may include specific vessel-related information (including, but not limited to, at least one of position data, speed data, draft data, voyage information, on-board fuel consumption sensor data, or maintenance records, and/or the like). In some cases, the third data may be data from one or more satellite-based observation systems and may include relational data associated with the one or more first water-based transport vessels within the predetermined geographical region relative to each other and relative to at least one of one or more anchorage points, one or more ports, or one or more preset waiting locations that are outside the one or more anchorage points and outside the one or more ports, and/or the like. In some instances, the relational data may include, without limitation, data regarding at least one of position, vector, and proximity of the one or more first water-based transport vessels within the predetermined geographical region relative to each other and relative to the at least one of the one or more anchorage points, the one or more ports, or the one or more preset waiting locations.

The computing system may analyze the at least two of the first data, the second data, or the third data to calculate an optimal course, target arrival time, and/or speed at which a first water-based transport vessel among the one or more first water-based transport vessels should travel from its current position to a first preset waiting location among the one or more preset waiting locations. According to the various embodiments, a waiting location (also referred to herein as a "Blue Box location" or the like), which is outside the anchorage point and outside the port, may be identified based at least in part on geographical and hydrographic data associated with at least one of the nearby port or one or more anchorage points around the nearby port, and/or the like.

In some instances, calculating the optimal course, target arrival time, and/or speed at which the first water-based transport vessel among the one or more first water-based transport vessels should travel from its current position to the first preset waiting location may comprise the computing system calculating the optimal course, target arrival time, and/or speed based at least in part on one or more of calculations to reduce waiting time for berthing at a nearby port while at the first preset waiting location, calculations to coordinate synchronous arrival with at least one other first water-based transport vessel, or calculations to reduce greenhouse gas ("GHG") emissions while travelling toward the waiting location, and/or the like.

The computing system may then send, to the first water-based transport vessel, a first message containing information regarding the optimal target arrival time or the optimal speed. In some cases, the first message may comprise instructions for travelling at the optimal speed and/or for arriving at the optimal target arrival time, based on contractual obligations binding each of one or more owners or operators of the first water-based transport vessel to follow the instructions. The analysis and sending processes may be repeated for each of the other water-based transport vessels that are travelling toward the waiting location or Blue Box location. Such processes may be applied to encompass more than a single port and more than a single waiting location.

According to some aspects, the optimized coordination of water-based transport vessels (referred to herein as "Blue Visby"), when implemented, may result in optimized coordination of water-based transport vessels, minimization of wait times at waiting locations, minimization of congestion at or near ports, and/or minimization of carbon emissions, and/or the like.

These and other aspects of the optimized coordination of water-based transport vessels ("Blue Visby") are described in greater detail with respect to the figures, in the APPENDIX to this application, and in the APPENDIX of the '424 Application, each APPENDIX being incorporated herein by reference in its entirety for all purposes.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, vehicle coordination technology, water-based transport vessel coordination technology, and/or the like. In other aspects, certain embodiments, can improve the functioning of user equipment or systems themselves (e.g., vehicle coordination systems, water-based transport vessel coordination systems, etc.), for example, by receiving, using a computing system and from one or more third party water-based transport vessel tracking systems, first data regarding a location of each water-based transport vessel among a plurality of water-based transport vessels within a predetermined geographical region; receiving, using the computing system and from each of one or more first water-based transport vessels among the plurality of water-based transport vessels, second data regarding specific vessel-related information including at least one of position data, speed data, draft data, voyage information, on-board fuel consumption sensor data, or maintenance records; receiving, using the computing system and from one or more satellite-based observation systems, third data regarding at least one of position, vector, and proximity of the one or more first water-based transport vessels within the predetermined geographical region relative to each other and relative to at least one of one or more anchorage points, one or more ports, or one or more preset waiting locations that are outside the one or more anchorage points and outside the one or more ports; analyzing, using the computing system, at least two of the first data, the second data, or the third data to calculate a corresponding optimal speed at which each first water-based transport vessel among the one or more first water-based transport vessels should travel along a corresponding first course from its current position to a corresponding first preset waiting location among the one or more preset waiting locations at the corresponding optimal target arrival time, based at least in part on one or more of calculations to reduce waiting time for berthing at a nearby port while at the corresponding first preset waiting location, calculations to coordinate synchronous arrival with at least one other first water-based transport vessel, or calculations to reduce greenhouse gas emissions while travelling along the first course; and sending, using the computing system and to each first water-based transport vessel, a message and instructions containing information regarding the corresponding optimal speed and/or the like.

In particular, to the extent any abstract concepts are present in the various embodiments, those concepts can be implemented as described herein by devices, software, systems, and methods that involve specific novel functionality (e.g., steps or operations), such as, by minimizing wait times by identifying appropriate waiting locations or Blue Box locations that serve as the arrival or destination target for all water-based transport vessels destined from the nearby port instead of the conventional (and typically congested) anchorage points, by calculating the optimal course, target arrival time, and/or speed for each water-based transport vessel heading toward port (and thus ultimately instructed to head toward waiting location or Blue Box location, in accordance with the various embodiments), by calculating how to reduce waiting time for berthing at a nearby port while at the first preset waiting location, by calculating how to coordinate synchronous arrival with at least one other first water-based transport vessel, and/or by calculating how to reduce greenhouse gas ("GHG") emissions while travelling toward the waiting location (where academic research suggests that for every knot that service speeds of water-based transport that is reduced, carbon dioxide ($CO_2$) savings of about 10-20% can be achieved, despite taking into account longer transit times at lower speeds; also the laws of hydrodynamics dictate that for every one unit of a ship's speed that is reduced, three units of fuel may be saved), and/or the like. and/or the like, to name a few examples, that extend beyond mere conventional computer processing operations. These functionalities can produce tangible results outside of the implementing computer system, including, merely by way of example, optimized coordination of water-based transport vessels, minimization of wait times at waiting locations, minimization of congestion at or near ports, minimization of carbon emissions, and/or the like, at least some of which may be observed or measured by customers and/or service providers.

In an aspect, a method may comprise receiving, using a computing system and from one or more third party water-based transport vessel tracking systems, first data regarding a location of each water-based transport vessel among a plurality of water-based transport vessels within a predetermined geographical region; receiving, using the computing system and from each of one or more first water-based transport vessels among the plurality of water-based transport vessels, second data regarding specific vessel-related information including at least one of position data, speed data, draft data, voyage information, on-board fuel consumption sensor data, or maintenance records; and receiving, using the computing system and from one or more satellite-based observation systems, third data regarding at least one of position, vector, and proximity of the one or more first water-based transport vessels within the predetermined geographical region relative to each other and relative to at least one of one or more anchorage points, one or more ports, or one or more preset waiting locations that are outside the one or more anchorage points and outside the one or more ports.

The method may also comprise analyzing, using the computing system, at least two of the first data, the second data, or the third data to calculate a corresponding optimal speed at which each first water-based transport vessel among the one or more first water-based transport vessels should travel along a corresponding first course from its current position to a corresponding first preset waiting location among the one or more preset waiting locations at the corresponding optimal target arrival time, based at least in part on one or more of calculations to reduce waiting time for berthing at a nearby port while at the corresponding first preset waiting location, calculations to coordinate synchronous arrival with at least one other first water-based transport vessel, or calculations to reduce greenhouse gas emissions while travelling along the first course. The method may further comprise sending, using the computing system and to each first water-based transport vessel, a message and instructions containing information regarding the corresponding optimal speed and target arrival time.

In another aspect, a method may comprise receiving, using a computing system, at least two of first data, second data, or third data, wherein the first data is data from one or more third party water-based transport vessel tracking systems and includes a location of each water-based transport vessel among a plurality of water-based transport vessels within a predetermined geographical region, wherein the second data is data associated with each of one or more first water-based transport vessels among the plurality of water-based transport vessels and includes specific vessel-related information, and wherein the third data is data from one or more satellite-based observation systems and includes relational data associated with the one or more first water-based transport vessels within the predetermined geographical region relative to each other and relative to at least one of one or more anchorage points, one or more ports, or one or more preset waiting locations that are outside the one or more anchorage points and outside the one or more ports. The method may further comprise analyzing, using the computing system, the at least two of the first data, the second data, or the third data to calculate an optimal speed at which a first water-based transport vessel among the one or more first water-based transport vessels should travel along a first course from its current position to a first preset waiting location among the one or more preset waiting locations at the corresponding optimal target arrival time; and sending, using the computing system and to the first water-based transport vessel, a first message containing information regarding the optimal speed and target arrival time.

In some embodiments, the computing system may comprise one of a water-based transport vessel coordination system, a server computer over a network, a cloud-based computing system over a network, or a distributed computing system, and/or the like. In some cases, the one or more third party water-based transport vessel tracking systems may comprise one or more of an automatic identification system ("AIS"), an Earth observation satellite-based vessel tracking system, a vessel traffic services ("VTS") system, a marine radar system, a harbormaster system, or a coast guard system, and/or the like. In some instances, the specific vessel-related information may comprise at least one of position data, speed data, draft data, voyage information, on-board fuel consumption sensor data, or maintenance records, and/or the like. In some cases, the relational data may comprise data regarding at least one of position, vector, and proximity of the one or more first water-based transport vessels within the predetermined geographical region relative to each other and relative to the at least one of the one or more anchorage points, the one or more ports, or the one or more preset waiting locations, and/or the like. In some instances, the method may further comprise analyzing, using the computing system, image or video data from the third data from the one or more satellite-based observation systems to generate the relational data.

According to some embodiments, calculating the optimal speed at which the first water-based transport vessel among the one or more first water-based transport vessels should travel along the first course from its current position to the first preset waiting location at the corresponding optimal target arrival time may comprise calculating, using the computing system, the optimal speed based at least in part on one or more of calculations to arrive at the optimal target arrival time and to reduce waiting time for berthing at a nearby port while at the first preset waiting location, calculations to coordinate synchronous arrival with at least one other first water-based transport vessel, or calculations to reduce greenhouse gas emissions while travelling along the first course, and/or the like.

In some embodiments, the first message may comprise instructions for travelling at the optimal speed, based on contractual obligations binding each of one or more owners or operators of the first water-based transport vessel to follow the instructions. According to some embodiments, receiving the at least two of first data, second data, or third data, analyzing the at least two of the first data, the second data, or the third data to calculate the optimal speed, and sending the first message are performed dynamically in real-time or near-real-time.

Merely by way of example, in some cases, the method may further comprise analyzing, using the computing system, the at least two of the first data, the second data, or the third data to calculate a corresponding optimal course and speed for each of two or more second water-based transport vessels among the one or more first water-based transport vessels within the predetermined geographical region to coordinate arrival at a second preset waiting location among the one or more preset waiting locations at an optimal target arrival time; and sending, using the computing system and to each second water-based transport vessel, a second message containing information regarding the corresponding optimal course, target arrival time, and/or speed. In some instances, calculating the corresponding optimal course, target arrival time, and/or speed for each of two or more second water-based transport vessels to coordinate arrival at the second preset waiting location may comprise calculating, using the computing system, each corresponding optimal course, target arrival time, and/or speed based at least in part on one or more of calculations to reduce waiting time for berthing at a nearby port while at the second preset waiting location, calculations to coordinate synchronous arrival of all of the two or more second water-based transport vessels, or calculations to reduce greenhouse gas emissions while travelling to the second preset waiting location, and/or the like. In some cases, the second message may comprise instructions for travelling at the corresponding optimal course and speed to arrive at the corresponding target arrival time, based on contractual obligations binding corresponding each of one or more owners or operators of a corresponding one of the two or more second water-based transport vessel to follow the instructions.

In some embodiments, the method may further comprise identifying, using the computing system, a preset waiting location among the one or more preset waiting locations based at least in part on geographical and hydrographic data associated with at least one of a nearby port or one or more anchorage points around the nearby port.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to:

receive at least two of first data, second data, or third data, wherein the first data is data from one or more third party water-based transport vessel tracking systems and includes a location of each water-based transport vessel among a plurality of water-based transport vessels within a predetermined geographical region, wherein the second data is data associated with each of one or more first water-based transport vessels among the plurality of water-based transport vessels and includes specific vessel-related information, and wherein the third data is data from one or more satellite-based observation systems and includes relational data associated with the one or more first water-based transport vessels within the predetermined geographical region relative to each other and relative to at least one of one or more anchorage points, one or more ports, or one or more preset waiting locations that are outside the one or more anchorage points and outside the one or more ports; analyze the at least two of the first data, the second data, or the third data to calculate an optimal speed at which a first water-based transport vessel among the one or more first water-based transport vessels should travel along a first course from its current position to a first preset waiting location among the one or more preset waiting locations at the corresponding optimal target arrival time; and send, to the first water-based transport vessel, a first message containing information regarding the optimal speed.

According to some embodiments, the computing system may comprise one of a water-based transport vessel coordination system, a server computer over a network, a cloud-based computing system over a network, or a distributed computing system, and/or the like. In some cases, calculating the optimal speed at which the first water-based transport vessel among the one or more first water-based transport vessels should travel along the first course from its current position to the first preset waiting location may comprise calculating, using the computing system, the optimal speed based at least in part on one or more of calculations to arrive at the corresponding optimal target arrival time to reduce waiting time for berthing at a nearby port while at the first preset waiting location, calculations to coordinate synchronous arrival with at least one other first water-based transport vessel, or calculations to reduce greenhouse gas emissions while travelling along the first course, and/or the like. In some instances, the first message may comprise instructions for travelling at the optimal speed, based on contractual obligations binding each of one or more owners or operators of the first water-based transport vessels to follow the instructions. In some instances, receiving the at least two of first data, second data, or third data, analyzing the at least two of the first data, the second data, or the third data to calculate the optimal speed and/or the optimal target arrival time, and sending the first message are performed dynamically in real-time or near-real-time.

In some embodiments, the first set of instructions, when executed by the at least one first processor, may further cause the computing system to: analyze the at least two of the first data, the second data, or the third data to calculate a corresponding optimal course, target arrival time, and/or speed for each of two or more second water-based transport vessels among the one or more first water-based transport vessels within the predetermined geographical region to coordinate arrival at a second preset waiting location among the one or more preset waiting locations; and send, to each second water-based transport vessel, a second message containing information regarding the corresponding optimal course, target arrival time, and/or speed.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing coordination of vehicles, and, more particularly, to methods, systems, and apparatuses for implementing optimized coordination of water-based transport vessels, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing optimized coordination of water-based transport vessels, in accordance with various embodiments.

In the non-limiting embodiment of FIG. 1, system 100 may comprise computing system 105 and corresponding database(s) 110 that are associated with service provider 115. System 100 may further comprise one or more water-based transport vessels 120a-120n (collectively, "vessels 120" or the like), one or more water-based transport vessels 125a-125n (collectively, "vessels 125" or the like), one or more water-based transport vessels 130a-130n (collectively, "vessels 130" or the like), and water-based transport vessel 130 that may be located at geographical region 135. In some cases, the water-based transport vessel 130 may be anchored or berthed at berth 140a (among berths 140a-140n) of port 140, while the one or more vessels 130a-130n may be anchored at anchorage point 145, and the one or more vessels 125a-125n may be anchored at waiting location or "Blue Box" location 150, while the one or more vessels 120a-120n may be headed toward the waiting location or "Blue Box" location 150. Each of these vessels 120-130— which may include, without limitation, bulk cargo vessels, dry bulk vessels, tanker vessels, container vessels, and/or the like—may communicatively couple with at least one of computing system 105, vessel information database(s) 160, satellite image database(s) 175, and/or tracking server 180a via one of the following: (i) relay 155 and network(s) 165; (ii) relay 155, one or more of satellites 170a-170n, and network(s) 165; (iii) one or more of satellites 170a-170n and network(s) 165; and/or the like. Herein, wireless communications may be denoted by the lightning bolt symbols, although line connections may denote either wireless or wired communications. The tracking server 180a and corresponding database(s) 180b may be associated with third party tracking provider(s) 185, while user devices 190a-190n may be respectively associated with corresponding owners and/or operators 195a-195n of each of the vessels 120-130.

According to some embodiments, network(s) 165 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 165 may include an access network of an Internet service provider ("ISP"). In another embodiment, the network(s) 165 may include a core network of the ISP and/or the Internet.

In some embodiments, the computing system 105 may include, without limitation, one of a water-based transport vessel coordination system, a server computer over a network, a cloud-based computing system over a network, or a distributed computing system, and/or the like. In some instances, the one or more third party water-based transport vessel tracking systems or tracking server 180a may include, but are not limited to, one or more of an automatic identification system ("AIS"), an Earth observation satellite-based vessel tracking system, a vessel traffic services ("VTS") system, a marine radar system, a harbormaster system, or a coast guard system, and/or the like. The computing system 105 may also integrate with electronic chart display and information system ("ECDIS") that may be used for navigation by one or more vessels 120-130.

In operation, computing system 105 may receive at least two of first data, second data, or third data. In some cases, the first data may be data from one or more third party water-based transport vessel tracking systems (in this case, tracking server 180a, or the like) and may include a location of each water-based transport vessel among a plurality of water-based transport vessels (in this case, vessels 120-130, or the like) within a predetermined geographical region (in this case, geographical region 135). In some instances, the second data may be data associated with each of one or more first water-based transport vessels among the plurality of water-based transport vessels and may include specific vessel-related information (including, but not limited to, at least one of position data, speed data, draft data (e.g., data regarding the distance between the waterline and the deepest point of the vessel, or the like), voyage information, on-board fuel consumption sensor data, or maintenance records, and/or the like). In some cases, the third data may be data from one or more satellite-based observation systems and may include relational data associated with the one or more first water-based transport vessels within the predetermined geographical region 135 relative to each other and relative to at least one of one or more anchorage points (in this case, anchorage point 145), one or more ports (in this case, port 140), or one or more preset waiting locations that are outside the one or more anchorage points and outside the one or more ports (in this case, waiting location or Blue Box location 150), and/or the like. In some instances, the relational data may include, without limitation, data regarding at least one of position, vector, and proximity of the one or more first water-based transport vessels within the predetermined geographical region relative to each other and relative to the at least one of the one or more anchorage points, the one or more ports, or the one or more preset waiting locations.

The computing system 105 may analyze the at least two of the first data, the second data, or the third data to calculate an optimal course, target arrival time, and/or speed at which a first water-based transport vessel among the one or more first water-based transport vessels (in this case, vessel 120 among vessels 120a-120n) should travel from its current position to a first preset waiting location (in this case, waiting location or Blue Box location 150) among the one or more preset waiting locations. According to the various embodiments, a waiting location 150 (also referred to herein as a "Blue Box location" or the like), which is outside the anchorage point 145 and outside the port 140, may be identified based at least in part on geographical and hydrographic data associated with at least one of the nearby port (in this case, port 140) or one or more anchorage points around the nearby port (in this case, anchorage point 145), and/or the like.

In some instances, calculating the optimal course, target arrival time, and/or speed at which the first water-based transport vessel among the one or more first water-based transport vessels should travel from its current position to the first preset waiting location may comprise the computing system 105 calculating the optimal course, target arrival time, and/or speed based at least in part on one or more of calculations to reduce waiting time for berthing at a nearby port (in this case, port 140) while at the first preset waiting location (in this case, waiting location 150), calculations to coordinate synchronous arrival with at least one other first water-based transport vessel, or calculations to reduce greenhouse gas ("GHG") emissions while travelling toward the waiting location, and/or the like.

The computing system 105 may then send, to the first water-based transport vessel, a first message containing information regarding the optimal speed and/or optimal target arrival time. In some cases, the first message may comprise instructions for travelling at the optimal speed, based on contractual obligations binding each of one or more owners or operators of the first water-based transport vessel to follow the instructions. The analysis and sending processes may be repeated for each of the other water-based transport vessels 120a-120n that are travelling toward the waiting location or Blue Box location 150. Such processes may be applied to encompass more than a single port and more than a single waiting location.

According to the various embodiments, waiting location or Blue Box location 150 may be identified and selected as a destination instead of anchorage point 145 because convention anchorage points are typical congestion hotspots at which water-based transport vessels following convention "Sail Fast, Then Wait" ("SFTW") operational model congregate. In some instances, the precise location of each Blue Box location 150 may take into account geographical and hydrographic data, and may be incorporated into ECDIS electronic charts, or the like. The various embodiments serve to minimize wait times by identifying appropriate waiting locations or Blue Box locations that serve as the arrival or destination target for all water-based transport vessels destined from the nearby port (in this case, port 140) instead of the conventional (and typically congested) anchorage points, by calculating the optimal course, target arrival time, and/or speed for each water-based transport vessel 120 heading toward port 140 (and thus ultimately instructed to head toward waiting location or Blue Box location 150, in accordance with the various embodiments), by calculating how to reduce waiting time for berthing at a nearby port (in this case, port 140) while at the first preset waiting location (in this case, waiting location 150), by calculating how to coordinate synchronous arrival with at least one other first water-based transport vessel, and/or by calculating how to reduce greenhouse gas ("GHG") emissions while travelling toward the waiting location (where academic research suggests that for every knot that service speeds of water-based transport that is reduced, carbon dioxide ($CO_2$) savings of about 10-20% can be achieved, despite taking into account longer transit times at lower speeds; also the laws of hydrodynamics dictate that for every one unit of a ship's speed that is reduced, three units of fuel may be saved), and/or the like.

In some aspects, the computing system 105 may recommend optimal arrival times that will be based on speeds for each vessel that will be slower than their service speed, resulting in the reduction of fuel consumption and, hence, reduction in GHG. In addition, the computing system 105 may take into account vessel-specific factors, in order to arrive at the environmentally optimal speed for each particular vessel at any particular stage of the voyage (referred to herein as "Blue Speed"). In some instances, these factors may include, without limitation, at least one of characteristics of each vessel (e.g., as published by the Classification Societies, or the like), length of stay at anchorage in warm waters (which increases the risk of hull fouling, which in turn increases hydrodynamic resistance and affects a ship's environmentally optimal speed, or the like), length of time since the vessel's last drydocking (at which time a vessel's hull is typically sandblasted, with hull coatings re-applied and engines overhauled—all leading to improved performance), and/or real-time fuel consumption data from onboard sensors of each vessel (in some cases, deploying Internet of Things technologies, or the like), and/or the like.

In some embodiments, the computing system 105 may allocate speeds to each vessel steaming towards a particular port on the basis that their arrival into the Blue Box in sequence that (a) takes into account the congestion at the anchorage and (b) retains the order in which the vessels would have arrived if they had each steamed at their respective service speeds. In this manner, the computing system 105 may assist ports to optimize their operations (particularly, with respect to the port's likely berthing optimization problem, which may depend largely on shore-side factors and which may regardless be side-stepped at least in part by the various embodiments implemented by the computing system). The computing system 105 may monitor conditions at each port, so as to sequence the arrival of steaming vessels into the Blue Box, in a way so that the arriving vessels proceed and wait at the anchorage for as short a period as possible. In some cases, the computing system 105 will not alter the sequence of the arrival of vessels into the Blue Box, but will only amend the timing of each arrival, and intervals between each arrival. Upon each vessel sailing from each departure port towards another (destination) port, the computing system may calculate the time the vessel would have arrived if it had steamed at its service speed (e.g., its "Waiting Estimated Time of Arrival" or "W/ETA" or the like) In light of the information about other vessels destined for the same (destination) port, the computing system may produce an estimated arrival sequence, essentially a queue number as if the vessel were joining a queue for entry into the port, except that the computing system may allocate that queue number not for port entry, but for arrival in the Blue Box (e.g., "Blue Box Queue [number]" or "BQ[number]" or the like). In light of congestion conditions, the computing system may apply one or more algorithms and may produce a different target time for arrival into the Blue Box (e.g., "Blue Estimated Time of Arrival" or "B/ETA" or the like), always retaining a vessel's BQ number. Neither the BQ number nor B/ETA nor Blue Speed will be static. Their values will change dynamically, as the computing system continually monitors conditions, including, but not limited to, more vessels steam to the same port from a shorter distance, problems causing delays to vessels, or worsening or improving congestion at port, and/or the like.

These and other functions of the system 100 (and its components) are described in greater detail below with respect to FIGS. 2-4.

Figure 2:
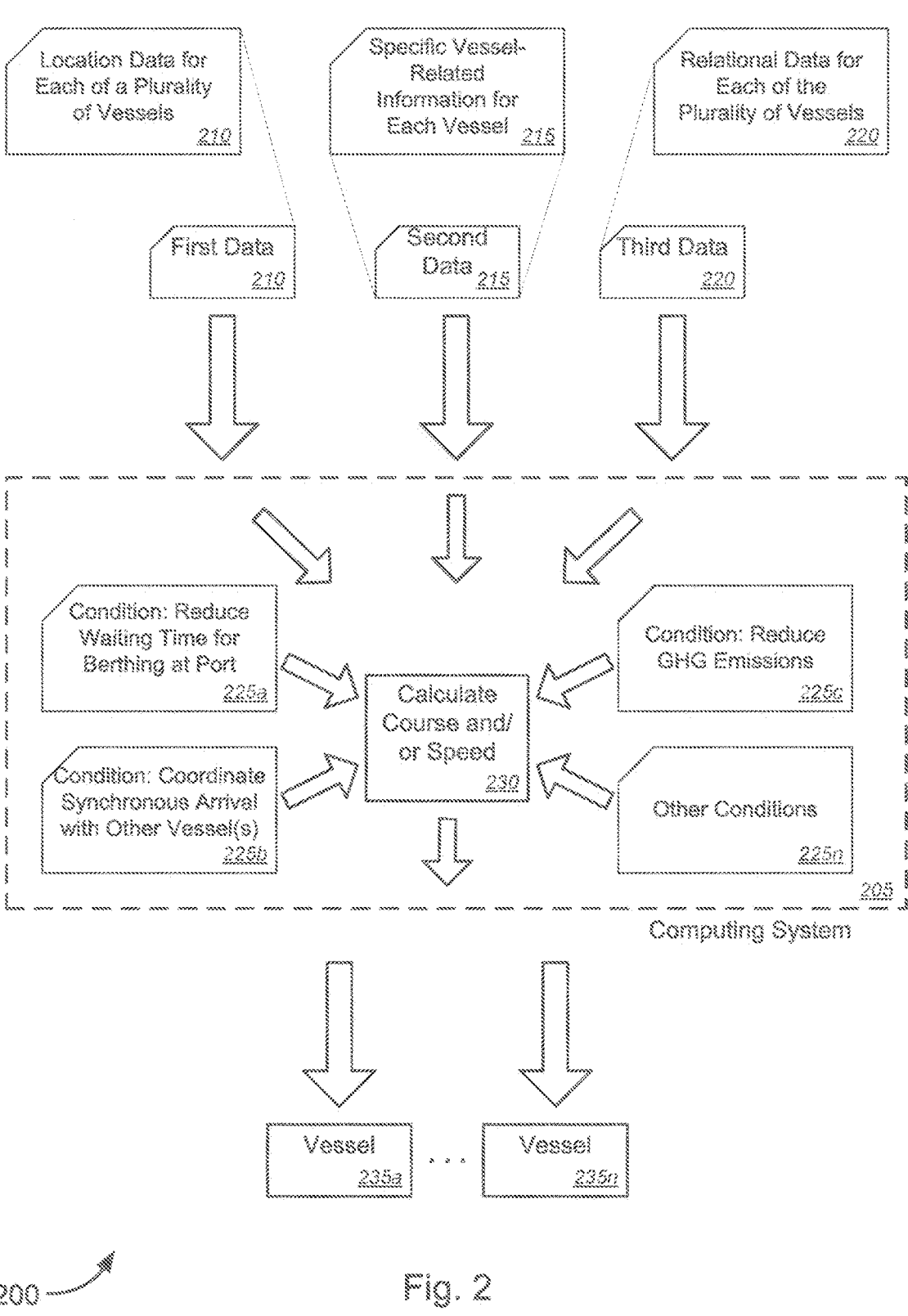
FIG. 2 is a schematic block flow diagram illustrating a non-limiting example of a process flow for calculating optimal course, target arrival time, and/or speed of water-based transport vessels for implementing optimized coordination of the water-based transport vessels, in accordance with various embodiments.

FIG. 2 is a schematic block flow diagram illustrating a non-limiting example 200 of a process flow for calculating optimal course, target arrival time, and/or speed of water-based transport vessels for implementing optimized coordination of the water-based transport vessels, in accordance with various embodiments.

As shown in the non-limiting embodiment 200 of FIG. 2, a computing system 205 may receive at least two of first data 210, second data 215, or third data 220 (as depicted in FIG. 2 by an arrow from each the first data 210, the second data 215, and the third data 220 to the computing system 205). In some cases, the first data 205 may be data from one or more third party water-based transport vessel tracking systems and may include location data for each water-based transport vessel among a plurality of water-based transport vessels within a predetermined geographical region. In some instances, the second data 215 may be data associated with each of one or more first water-based transport vessels among the plurality of water-based transport vessels and may include specific vessel-related information (including, but not limited to, at least one of position data, speed data, draft data, voyage information, on-board fuel consumption sensor data, or maintenance records, and/or the like) for each vessel. In some cases, the third data 220 may be data from one or more satellite-based observation systems and may include relational data associated with the one or more first water-based transport vessels within the predetermined geographical region relative to each other and relative to at least one of one or more anchorage points, one or more ports, or one or more preset waiting locations that are outside the one or more anchorage points and outside the one or more ports, and/or the like. In some instances, the relational data may include, without limitation, data regarding at least one of position, vector, and proximity of the one or more first water-based transport vessels within the predetermined geographical region relative to each other and relative to the at least one of the one or more anchorage points, the one or more ports, or the one or more preset waiting locations.

The computing system 205 may analyze the at least two of the first data, the second data, or the third data to calculate an optimal course, target arrival time, and/or speed (at block 230) at which a water-based transport vessel(s) among the one or more first water-based transport vessels should travel from its current position to a first preset waiting location among the one or more preset waiting locations. In some instances, calculating the optimal course, target arrival time, and/or speed at which the first water-based transport vessel among the one or more first water-based transport vessels should travel from its current position to the first preset waiting location may comprise calculating, using the computing system, the optimal course, target arrival time, and/or speed based at least in part on one or more conditions (denoted in FIG. 2 by arrows from the conditions 225a-225n to the calculation block 230). According to some embodiments, the one or more conditions may include, without limitation, at least one of reducing waiting time for berthing at a nearby port (block 225a) while at the first preset waiting location, coordinating synchronous arrival with at least one other water-based transport vessel(s) (block 225b), reducing greenhouse gas ("GHG") emissions while travelling toward the waiting location (block 225c), or other conditions (block 225n), and/or the like.

The computing system 205 may then send, to the water-based transport vessel(s) 235a-235n, a first message containing information regarding the optimal speed (denoted in FIG. 2 by the arrows from the computing system 205 to the vessels 235a-235n). In some cases, the first message may comprise instructions for travelling at the optimal speed along the optimal course and speed to arrive at the corresponding target arrival time, based on contractual obligations binding each of one or more owners or operators of the water-based transport vessel(s) to follow the instructions.

Figure 3:
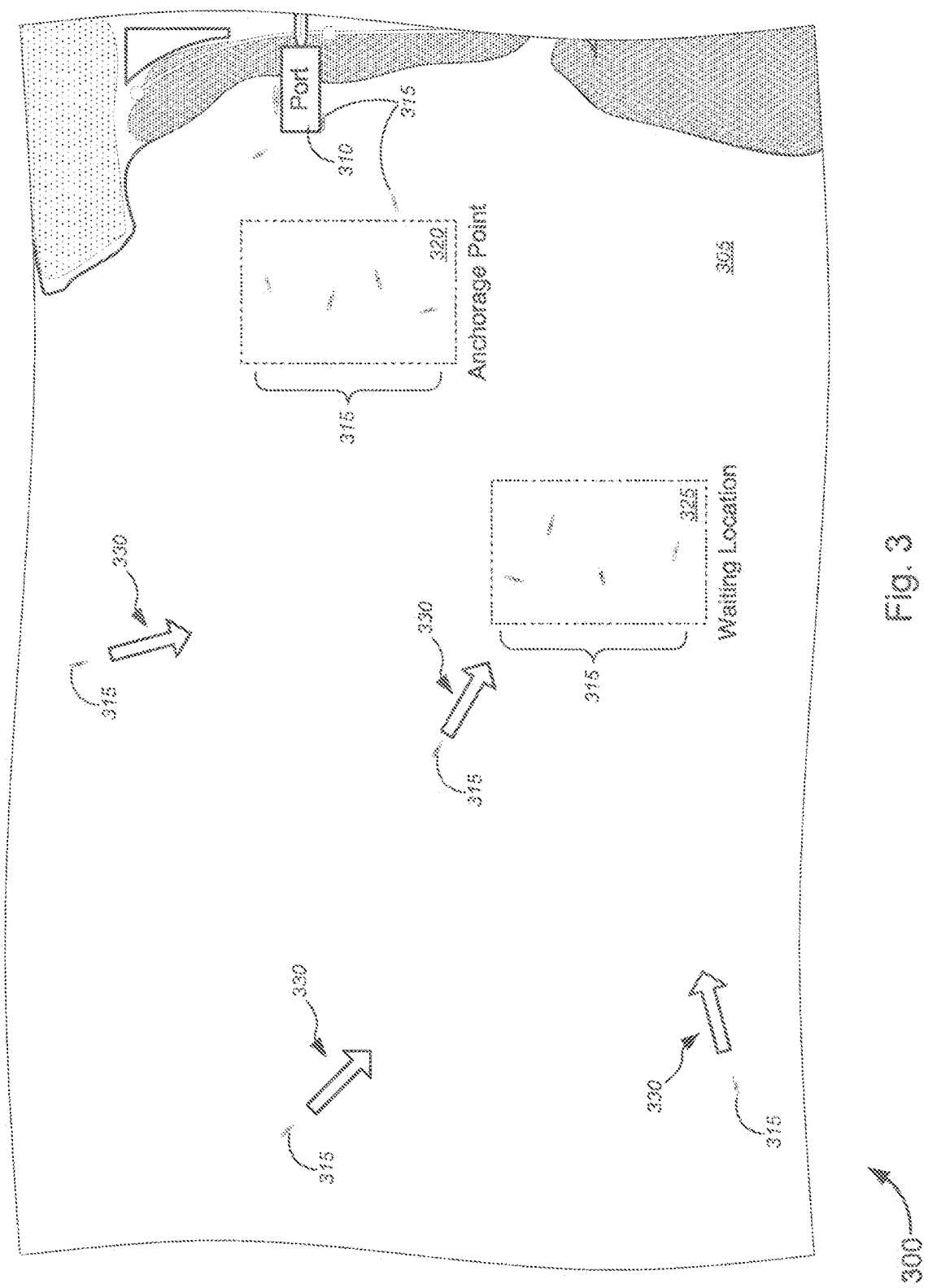
FIG. 3 is a schematic diagram illustrating a non-limiting example of a geographic region in which optimized coordination of water-based transport vessels may be implemented, in accordance with various embodiments.

FIG. 3 is a schematic diagram illustrating a non-limiting example 300 of a geographic region 305 in which optimized coordination of water-based transport vessels may be implemented, in accordance with various embodiments.

In the non-limiting embodiment of FIG. 3, a port 310 (with a plurality of berths, not shown) is depicted located in geographical region 305. Among a plurality of water-based transport vessels 315—which may include, without limitation, bulk cargo vessels, dry bulk vessels, tanker vessels, container vessels, and/or the like—some may be berthed at the port 310, while some may be anchored at the anchorage point 320 waiting to be berthed. According to the various embodiments, a waiting location 325 (also referred to herein as a "Blue Box location" or the like), which is outside the anchorage point 320 and outside the port 310, may be identified based at least in part on geographical and hydro-graphic data associated with at least one of the nearby port (in this case, port 310) or one or more anchorage points around the nearby port (in this case, anchorage point 320), and/or the like.

The system may track one or more water-based transport vessels 315 whose destination is port 310, by receiving at least two of first data, second data, or third data. In some cases, the first data may be data from one or more third party water-based transport vessel tracking systems and may include a location of each water-based transport vessel among a plurality of water-based transport vessels 315 within a predetermined geographical region (in this case, geographical region 305). In some instances, the second data may be data associated with each of one or more first water-based transport vessels among the plurality of water-based transport vessels 315 and may include specific vessel-related information (including, but not limited to, at least one of position data, speed data, draft data, voyage information, on-board fuel consumption sensor data, or maintenance records, and/or the like). In some cases, the third data may be data from one or more satellite-based observation systems and may include relational data associated with the one or more first water-based transport vessels 315 within the predetermined geographical region 305 relative to each other 315 and relative to at least one of one or more anchorage points (in this case, anchorage point 320), one or more ports (in this case, port 310), or one or more preset waiting locations that are outside the one or more anchorage points and outside the one or more ports (in this case, waiting location or Blue Box location 325), and/or the like. In some instances, the relational data may include, without limitation, data regarding at least one of position, vector, and proximity of the one or more first water-based transport vessels within the predetermined geographical region relative to each other and relative to the at least one of the one or more anchorage points, the one or more ports, or the one or more preset waiting locations.

The system may analyze the at least two of the first data, the second data, or the third data to calculate an optimal course, target arrival time, and/or speed at which a first water-based transport vessel among the one or more first water-based transport vessels should travel from its current position to a first preset waiting location (in this case, waiting location or Blue Box location 325) among the one or more preset waiting locations. Herein, the optimal course, target arrival time, and/or speed is denoted in FIG. 3 by the arrow 330 in front of each water-based transport vessel 315 in geographical region 305 that is travelling toward the waiting location 325. In some instances, calculating the optimal course, target arrival time, and/or speed at which the first water-based transport vessel among the one or more first water-based transport vessels should travel from its current position to the first preset waiting location may comprise calculating, using the computing system, the optimal course, target arrival time, and/or speed based at least in part on one or more of calculations to reduce waiting time for berthing at a nearby port (in this case, port 310) while at the first preset waiting location (in this case, waiting location 325), calculations to coordinate synchronous arrival with at least one other first water-based transport vessel, or calculations to reduce greenhouse gas emissions while travelling toward the waiting location, and/or the like.

The system may then send, to the first water-based transport vessel, a first message containing information regarding the optimal speed and/or optimal target arrival time. In some cases, the first message may comprise instructions for travelling at the optimal speed, based on contractual obligations binding each of one or more owners or operators of the first water-based transport vessel to follow the instructions. The analysis and sending processes may be repeated for each of the other water-based transport vessels 315 that are travelling toward the waiting location 325. Such processes may be applied to encompass more than a single port and more than a single waiting location.

Figure 4B:
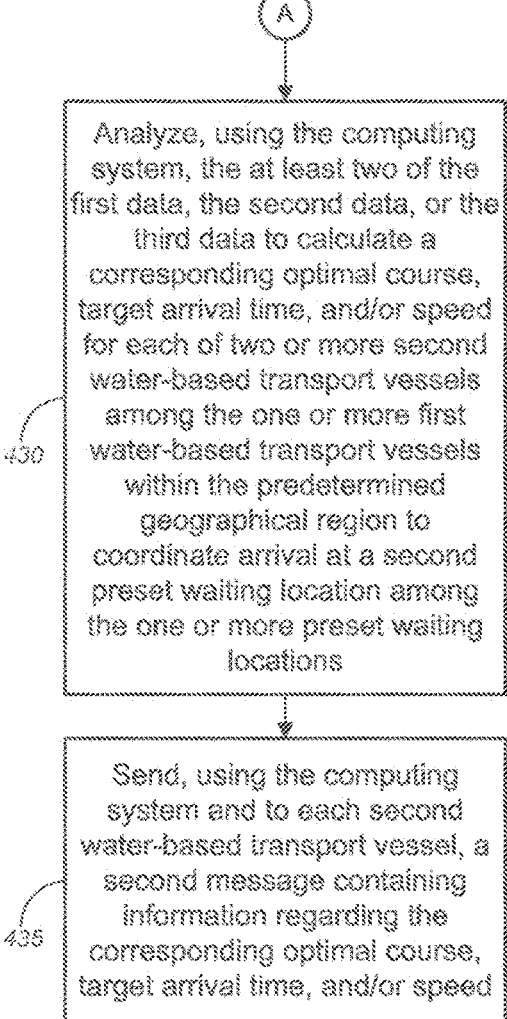

FIGS. 4A and 4B (collectively, "FIG. 4") are flow diagrams illustrating a method 400 for implementing optimized coordination of water-based transport vessels, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400, at block 405, may comprise receiving, using a computing system and from one or more third party water-based transport vessel tracking systems, first data regarding a location of each water-based transport vessel among a plurality of water-based transport vessels within a predetermined geographical region. In some embodiments, the computing system may include, without limitation, one of a water-based transport vessel coordination system, a server computer over a network, a cloud-based computing system over a network, or a distributed computing system, and/or the like. In some instances, the one or more third party water-based transport vessel tracking systems may include, but are not limited to, one or more of an automatic identification system ("AIS"), an Earth observation satellite-based vessel tracking system, a vessel traffic services ("VTS") system, a marine radar system, a harbormaster system, or a coast guard system, and/or the like.

At block 410, method 400 may comprise receiving, using the computing system and from (or associated with) each of one or more first water-based transport vessels among the plurality of water-based transport vessels, second data regarding specific vessel-related information. In some cases, the specific vessel-related information may include, without limitation, at least one of position data, speed data, draft data, voyage information, on-board fuel consumption sensor data, or maintenance records, and/or the like.

Method 400 may further comprise, at block 415, receiving, using the computing system and from one or more satellite-based observation systems, third data regarding relational data associated with the one or more first water-based transport vessels within the predetermined geographical region relative to each other and relative to at least one of one or more anchorage points, one or more ports, or one or more preset waiting locations (referred to herein as "Blue Box locations") that are outside the one or more anchorage points and outside the one or more ports. In some instances, the relational data may include, but is not limited to, data regarding at least one of position, vector, and proximity of the one or more first water-based transport vessels within the predetermined geographical region relative to each other and relative to the at least one of the one or more anchorage points, the one or more ports, or the one or more preset waiting locations, and/or the like. In some cases, the computing system may analyze image or video data from the third data from the one or more satellite-based observation systems to generate the relational data.

According to some embodiments, the computing system might receive all three of the first data (at block 405), the second data (at block 410), and the third data (at block 415). Alternatively, the computing system may receive at least two of the first data (at block 405), the second data (at block 410), or the third data (at block 415). In some instances, receiving the at least two of first data, second data, or third data, analyzing the at least two of the first data, the second data, or the third data to calculate the optimal speed and/or optimal target arrival time, and sending the first message may be performed dynamically in real-time or near-real-time.

Method 400, at block 420, may comprise analyzing, using the computing system, at least two of the first data, the second data, or the third data to calculate an optimal speed at which a first water-based transport vessel among the one or more first water-based transport vessels should travel along a first course from its current position to a first preset waiting location among the one or more preset waiting locations at a corresponding optimal target arrival time. In some instances, calculating the optimal speed at which the first water-based transport vessel among the one or more first water-based transport vessels should travel along the first course from its current position to the first preset waiting location may comprise calculating, using the computing system, the optimal speed and/or optimal target arrival time based at least in part on one or more of calculations to reduce waiting time for berthing at a nearby port while at the first preset waiting location, calculations to coordinate synchronous arrival with at least one other first water-based transport vessel, or calculations to reduce greenhouse gas emissions while travelling along the first course, and/or the like. In some embodiments, the first preset waiting location may be identified, by the computing system, based at least in part on geographical and hydrographic data associated with at least one of a nearby port or one or more anchorage points around the nearby port.

Method 400 may further comprise sending, using the computing system and to the first water-based transport vessel, a first message containing information regarding the optimal speed and/or optimal target arrival time (block 425). In some cases, the first message may comprise instructions for travelling at the optimal speed (to arrive at the optimal target arrival time), based on contractual obligations binding each of one or more owners or operators of the first water-based transport vessel to follow the instructions.

Method 400 may continue onto the process at block 430 in FIG. 4B following the circular marker denoted, "A."

At block 430 in FIG. 4B (following the circular marker denoted, "A"), method 400 may comprise analyzing, using the computing system, the at least two of the first data, the second data, or the third data to calculate a corresponding optimal course, target arrival time, and/or speed for each of two or more second water-based transport vessels among the one or more first water-based transport vessels within the predetermined geographical region to coordinate arrival at a second preset waiting location among the one or more preset waiting locations. In some cases, the first preset waiting location and the second preset waiting location are the same location. Alternatively, the first preset waiting location and the second preset waiting location may be separate locations. Method 400, at block 435, may comprise sending, using the computing system and to each second water-based transport vessel, a second message containing information regarding the corresponding optimal course, target arrival time, and/or speed.

In some embodiments, calculating the corresponding optimal course, target arrival time, and/or speed for each of two or more second water-based transport vessels to coordinate arrival at the second preset waiting location may comprise calculating, using the computing system, each corresponding optimal course, target arrival time, and/or speed based at least in part on one or more of calculations to reduce waiting time for berthing at a nearby port while at the second preset waiting location, calculations to coordinate synchronous arrival of all of the two or more second water-based transport vessels, or calculations to reduce greenhouse gas emissions while travelling to the second preset waiting location, and/or the like. In some cases, the second message may comprise instructions for travelling at the corresponding optimal course and speed to arrive at the corresponding target arrival time, based on contractual obligations binding corresponding each of one or more owners or operators of a corresponding one of the two or more second water-based transport vessel to follow the instructions.

Exemplary System and Hardware Implementation

Figure 5:
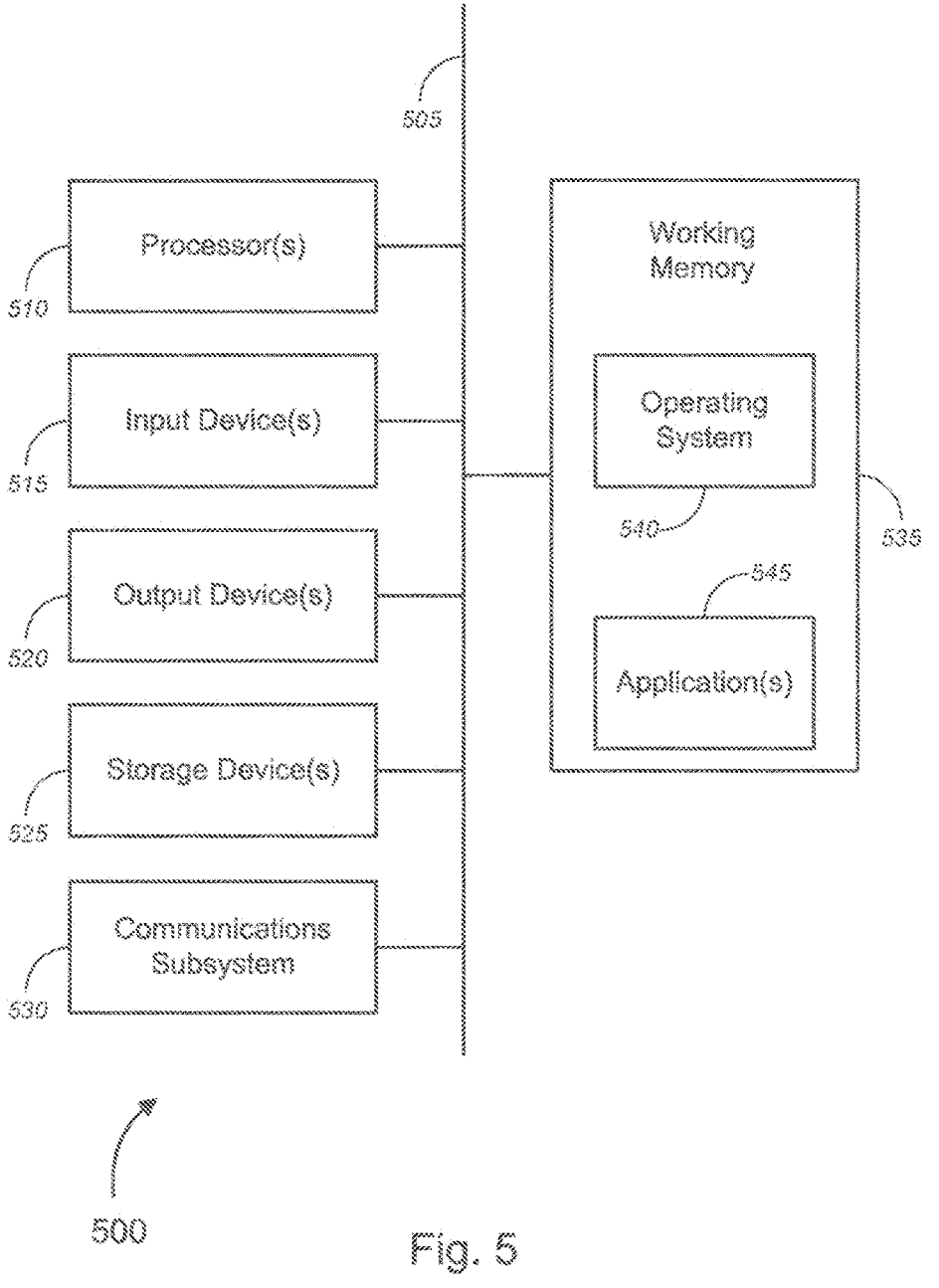
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105 and 205, tracking server 180a, and user devices 190a-190n, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105 and 205, tracking server 180a, and user devices 190a-190n, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
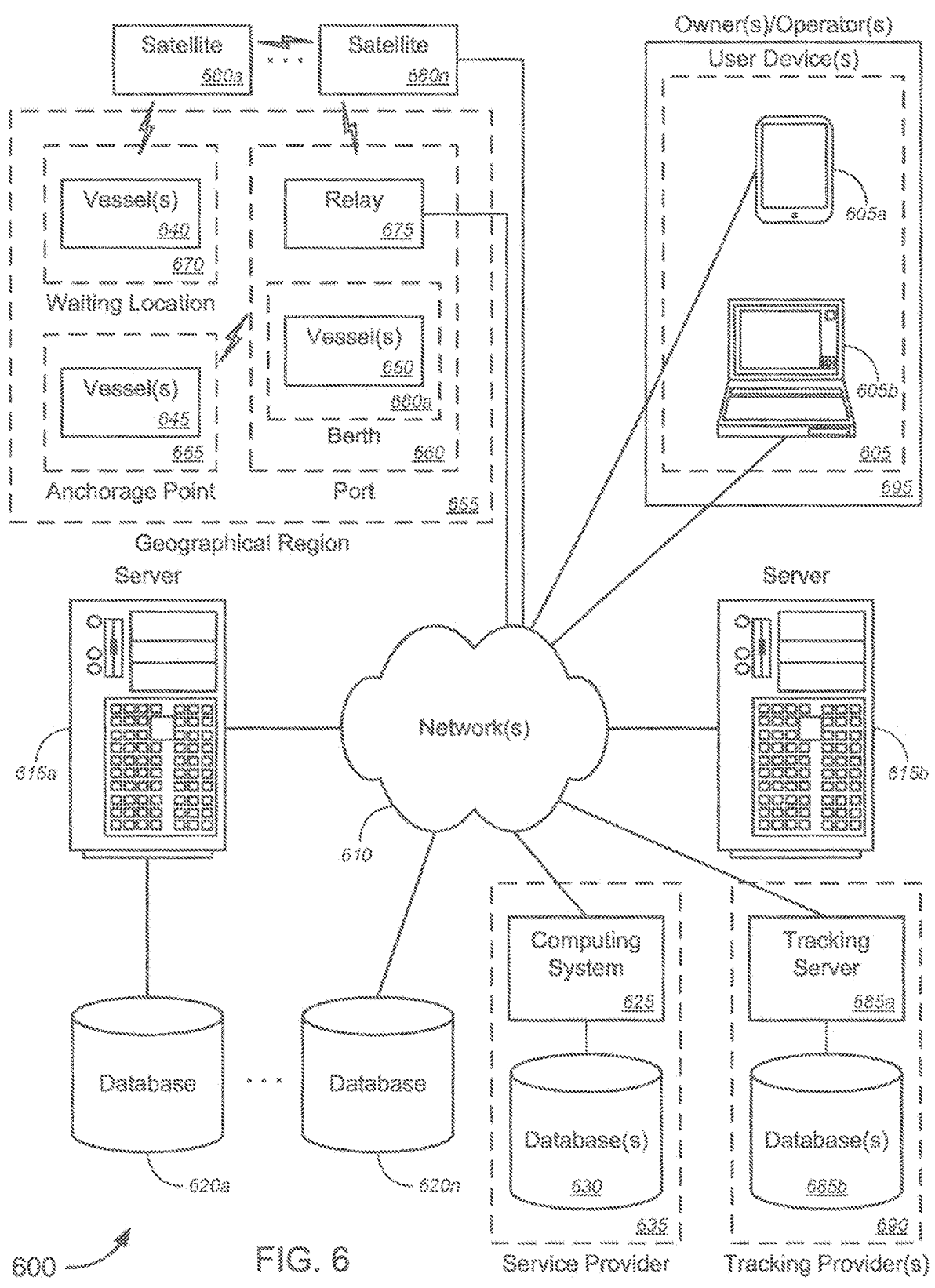
FIG. 6 is a block diagram illustrating a networked system of computers, computing systems, or system hardware architecture, which can be used in accordance with various embodiments.

As noted above, a set of embodiments comprises methods and systems for implementing coordination of vehicles, and, more particularly, to methods, systems, and apparatuses for implementing optimized coordination of water-based transport vessels. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™ AppleTalk™, and the like. Merely by way of example, the network(s) 610 (similar to network(s) 165 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™ Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing coordination of vehicles, and, more particularly, to methods, systems, and apparatuses for implementing optimized coordination of water-based transport vessels, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise computing system 625 and corresponding database(s) 630 that are associated with service provider 635 (similar to computing systems 105 and 205 of FIGS. 1 and 2, as well as corresponding database(s) 110, that are associated with service provider 115 of FIG. 1, or the like). System 600 may further comprise one or more vessels 640 (similar to vessels 125a-125n, 235a-235n, and 315 of FIGS. 1-3, or the like), one or more vessels 645 (similar to vessels 130a-130n and 315 of FIGS. 1 and 3, or the like), and one or more vessels 650 (similar to vessel 130 and 315 of FIGS. 1 and 3, or the like) that may be located at geographical region 655 (similar to geographical regions 135 and 305 of FIGS. 1 and 3, or the like). In some cases, the one or more vessels 650 may be anchored or berthed at berth(s) 660a of port 660 (similar to ports 140 and 310 of FIGS. 1 and 3, or the like), while the one or more vessels 645 may be anchored at anchorage point 665 (similar to anchorage points 145 and 320 of FIGS. 1 and 3, or the like), and one or more vessels 640 may be headed toward and may eventually anchor at waiting location 670 (similar to waiting locations or Blue Box locations 150 and 325 of FIGS. 1 and 3, or the like). Each of these vessels 640-650 may communicatively couple with at least one of server 615a, server 615b, databases 620a-620n (which may include vessel information database (s) and/or satellite image database(s) (similar to vessel information database(s) 160 and satellite image database(s) 175, respectively, of FIG. 1, or the like), computing system 625, and/or tracking server 685a via one of the following: (i) relay 675 and network(s) 610; (ii) relay 675, one or more of satellites 680a-680n, and network(s) 610; (iii) one or more of satellites 680a-680n and network(s) 610; and/or the like. Herein, wireless communications may be denoted by the lightning bolt symbols, although line connections may denote either wireless or wired communications. The tracking server 685a and corresponding database(s) 685b may be associated with tracking provider(s) 690 (similar to tracking server 180a and corresponding database(s) 180b that are associated with third party tracking provider(s) 185 of FIG. 1, or the like), while the user devices 605a and 605b may be associated with corresponding owners and/or operators of each of the vessels 640-650 (similar to user devices 190a-190n respectively associated with owners/operators 195a-195n of FIG. 1, or the like).

The functions of the system 600 (and its components) are described in greater detail above with respect to systems and examples 100, 200, 300, and 400 of FIGS. 1-4 (and the corresponding systems and components thereof).

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing coordination of water-based transport vessels in a body of water, the method comprising:

receiving, using a computing system and from one or more third party water-based transport vessel tracking systems, first data regarding a location of each water-based transport vessel among a plurality of water-based transport vessels in the body of water within a predetermined geographical region;

receiving, using the computing system and from each of one or more first water-based transport vessels among the plurality of water-based transport vessels, second data regarding specific vessel-related information including at least one of position data, speed data, draft data, voyage information, on-board fuel consumption sensor data, or maintenance records;

receiving, using the computing system and from one or more satellite-based observation systems, third data regarding at least one of position, vector, and proximity of the one or more first water-based transport vessels within the predetermined geographical region relative to each other and relative to at least one of one or more anchorage points, one or more ports, or one or more preset waiting locations that are outside the one or more anchorage points and outside the one or more ports;

analyzing, using the computing system, at least two of the first data, the second data, or the third data to calculate a corresponding optimal speed at which each first water-based transport vessel in the body of the water among the one or more first water-based transport vessels should travel along a corresponding first course from its current position to a corresponding first preset waiting location among the one or more preset waiting locations to arrive at a corresponding optimal target arrival time, based at least in part on calculations to coordinate synchronous arrival or sequential arrival with at least one other first water-based transport vessel traveling in the body of water to the first preset waiting location, the one or more calculations comprising:

calculating an estimated arrival time for two or more water-based transport vessels travelling to a first port, corresponding to the time each water-based transport vessel would arrive at the first port if it travelled at its service speed;

producing an estimated arrival sequence to the first port;

producing a queue number for arrival into the first preset waiting location for the two or more water-based transport vessels based on the estimated arrival sequence to the first port; and producing the optimal target arrival time different to the estimated arrival time for each water-based transport vessel, with the corresponding optimal speed, whilst retaining the queue number for each water-based transport vessel; and sending, using the computing system and to each first water-based transport vessel, the optimal speed and the optimal target arrival time to the first water-based transport vessel to cause the first water-based transport vessel to travel at the optimal speed to the first preset waiting location.

2. A method for implementing coordination of water-based transport vessels in a body of water, the method comprising:

receiving, using a computing system, at least two of first data, second data, or third data, wherein the first data is data from one or more third party water-based transport vessel tracking systems and includes a location of each water-based transport vessel in the body of water among a plurality of water-based transport vessels in the body of water within a predetermined geographical region, wherein the second data is data associated with each of one or more first water-based transport vessels among the plurality of water-based transport vessels and includes specific vessel-related information, and wherein the third data is data from one or more satellite-based observation systems and includes relational data associated with the one or more first water-based transport vessels within the predetermined geographical region relative to each other and relative to at least one of one or more anchorage points, one or more ports, or one or more preset waiting locations that are outside the one or more anchorage points and outside the one or more ports;

analyzing, using the computing system, the at least two of the first data, the second data, or the third data to calculate an optimal speed at which a first water-based transport vessel in the body of water among the one or more first water-based transport vessels should travel along a first course from its current position to a first preset waiting location among the one or more preset waiting locations to arrive at a corresponding optimal target arrival time based on one or more calculations to coordinate synchronous arrival or sequential arrival with at least one other first water-based transport vessel traveling in the body of water to the first preset waiting location, the one or more calculations comprising:

calculating an estimated arrival time for two or more water-based transport vessels travelling to a first port, corresponding to the time each water-based transport vessel would arrive at the first port if it travelled at its service speed;

producing an estimated arrival sequence to the first port;

producing a queue number for arrival into the first preset waiting location for the two or more water-based transport vessels based on the estimated arrival sequence to the first port; and producing the optimal target arrival time different to the estimated arrival time for each water-based transport vessel, with the corresponding optimal speed, whilst retaining the queue number for each water-based transport vessel; and sending, using the computing system and to the first water-based transport vessel the optimal speed and the optimal target arrival time to the first water-based transport vessel to cause the first water-based transport vessel to travel at the optimal speed to the first preset waiting location.

3. The method of claim 2, wherein the computing system comprises one of a water-based transport vessel coordination system, a server computer over a network, a cloud-based computing system over a network, or a distributed computing system.

4. The method of claim 2, wherein the one or more third party water-based transport vessel tracking systems comprise one or more of an automatic identification system ("AIS"), an Earth observation satellite-based vessel tracking system, a vessel traffic services ("VTS") system, a marine radar system, a harbormaster system, or a coast guard system.

5. The method of claim 2, wherein the specific vessel-related information comprises at least one of position data, speed data, draft data, voyage information, on-board fuel consumption sensor data, or maintenance records.

6. The method of claim 2, wherein the relational data comprises data regarding at least one of position, vector, and proximity of the one or more first water-based transport vessels within the predetermined geographical region relative to each other and relative to the at least one of the one or more anchorage points, the one or more ports, or the one or more preset waiting locations.

7. The method of claim 6, further comprising:

analyzing, using the computing system, image or video data from the third data from the one or more satellite-based observation systems to generate the relational data.

8. The method of claim 2, wherein calculating the optimal speed at which the first water-based transport vessel among the one or more first water-based transport vessels should travel along the first course from its current position to the first preset waiting location at the corresponding optimal target arrival time further comprises calculating, using the computing system, the optimal speed based at least in part on calculations to reduce greenhouse gas emissions while travelling along the first course.

9. The method of claim 2, further comprising sending a first message comprising instructions for travelling at the optimal speed, based on contractual obligations binding each of one or more owners or operators of the first water-based transport vessel to follow the instructions.

10. The method of claim 2, wherein receiving the at least two of first data, second data, or third data, analyzing the at least two of the first data, the second data, or the third data to calculate the optimal speed and/or the optimal target arrival time, and sending the optimal speed and the optimal arrival time are performed dynamically in real-time or near-real-time.

11. The method of claim 2, further comprising:

analyzing, using the computing system, the at least two of the first data, the second data, or the third data to calculate a corresponding optimal course, target arrival time, and/or speed for each of two or more second water-based transport vessels among the one or more first water-based transport vessels within the predetermined geographical region to coordinate arrival at a second preset waiting location among the one or more preset waiting locations; and sending, using the computing system and to each second water-based transport vessel, the corresponding optimal course, target arrival time, and/or speed to each of two or more second water-based transport vessels to cause each of two or more second water-based transport vessels to travel at the corresponding optimal speed to the first preset waiting location.

12. The method of claim 11, wherein calculating the corresponding optimal course, target arrival time, and/or speed for each of two or more second water-based transport vessels to coordinate arrival at the second preset waiting location comprises calculating, using the computing system, each corresponding optimal course, target arrival time, and/or speed based at least in part on calculations to reduce greenhouse gas emissions while travelling to the second preset waiting location.

13. The method of claim 11, further comprising sending a second message comprising instructions for travelling at the corresponding optimal course and speed to arrive at the corresponding target arrival time, based on contractual obligations binding corresponding each of one or more owners or operators of a corresponding one of the two or more second water-based transport vessel to follow the instructions.

14. The method of claim 2, further comprising:
   identifying, using the computing system, a preset waiting location among the one or more preset waiting locations based at least in part on geographical and hydrographic data associated with at least one of a nearby port or one or more anchorage points around the nearby port.

15. A system for implementing coordination of water-based transport vessels in a body of water, the system comprising:
   a computing system, comprising:
      at least one first processor; and
      a first non-transitory computer readable medium communicatively coupled to the at least one first processor, the first non-transitory computer readable medium having stored thereon computer software comprising a first set of instructions that, when executed by the at least one first processor, causes the computing system to:
         receive at least two of first data, second data, or third data, wherein the first data is data from one or more third party water-based transport vessel tracking systems and includes a location of each water-based transport vessel in the body of water among a plurality of water-based transport vessels in the body of water within a predetermined geographical region, wherein the second data is data associated with each of one or more first water-based transport vessels among the plurality of water-based transport vessels and includes specific vessel-related information, and wherein the third data is data from one or more satellite-based observation systems and includes relational data associated with the one or more first water-based transport vessels within the predetermined geographical region relative to each other and relative to at least one of one or more anchorage points, one or more ports, or one or more preset waiting locations that are outside the one or more anchorage points and outside the one or more ports;
         analyze the at least two of the first data, the second data, or the third data to calculate an optimal speed at which a first water-based transport vessel in the body of water among the one or more first water-based transport vessels should travel along a first course from its current position to a first preset waiting location among the one or more preset waiting locations to arrive at a corresponding optimal target arrival time based on one or more calculations to coordinate synchronous arrival or sequential arrival with at least one other first water-based transport vessel traveling in the body of water to the first preset waiting location, the one or more calculations comprising:
            calculating an estimated arrival time for two or more water-based transport vessels travelling to a first port, corresponding to the time each water-based transport vessel would arrive at the first port if it travelled at its service speed;
            producing an estimated arrival sequence to the first port;
            producing a queue number for arrival into the first preset waiting location for the two or more water-based transport vessels based on the estimated arrival sequence to the first port; and
            producing the optimal target arrival time different to the estimated arrival time for each water-based transport vessel, with the corresponding optimal speed, whilst retaining the queue number for each water-based transport vessel; and
         send, to the first water-based transport vessel, the optimal speed and the optimal target arrival time to the first water-based transport vessel to cause the first water-based transport vessel to travel at the optimal speed to the first preset waiting location.

16. The system of claim 15, wherein the computing system comprises one of a water-based transport vessel coordination system, a server computer over a network, a cloud-based computing system over a network, or a distributed computing system.

17. The system of claim 15, wherein calculating the optimal speed at which the first water-based transport vessel among the one or more first water-based transport vessels should travel along the first course from its current position to the first preset waiting location at the corresponding optimal target arrival time further comprises calculating, using the computing system, the optimal speed based at least in part on calculations to reduce greenhouse gas emissions while travelling along the first course.

18. The system of claim 15, wherein the computing system is further configured to send a first message comprising instructions for travelling at the optimal speed, based on contractual obligations binding each of one or more owners or operators of the first water-based transport vessels to follow the instructions.

19. The system of claim 15, wherein receiving the at least two of first data, second data, or third data, analyzing the at least two of the first data, the second data, or the third data to calculate the optimal speed and/or the optimal target arrival time, and sending the optimal speed and optimal arrival time are performed dynamically in real-time or near-real-time.

20. The system of claim 15, wherein the first set of instructions, when executed by the at least one first processor, further causes the computing system to:
   analyze the at least two of the first data, the second data, or the third data to calculate a corresponding optimal course, target arrival time, and/or speed for each of two or more second water-based transport vessels among the one or more first water-based transport vessels within the predetermined geographical region to coordinate arrival at a second preset waiting location among the one or more preset waiting locations; and
   send, to each second water-based transport vessel, the corresponding optimal course, target arrival time, and/or speed.

* * * * *